US010657431B2

(12) United States Patent
Lektomiller

(10) Patent No.: US 10,657,431 B2
(45) Date of Patent: *May 19, 2020

(54) ENERGY HARVESTING RFID CIRCUIT, ENERGY HARVESTING RFID TAG, AND ASSOCIATED METHODS

(71) Applicant: LenLok Holdings, LLC, Willoughby, OH (US)

(72) Inventor: Joseph Michael Lektomiller, Thornton, CO (US)

(73) Assignee: LENLOCK HOLDINGS, LLC, Willoughby, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/204,415

(22) Filed: Nov. 29, 2018

(65) Prior Publication Data

US 2019/0095769 A1    Mar. 28, 2019

Related U.S. Application Data

(63) Continuation of application No. 15/636,263, filed on Jun. 28, 2017, now Pat. No. 10,176,416.

(51) Int. Cl.
*G06K 19/07* (2006.01)
*G06K 19/077* (2006.01)

(52) U.S. Cl.
CPC ... *G06K 19/0709* (2013.01); *G06K 19/07773* (2013.01)

(58) Field of Classification Search
CPC ........... G06K 19/0707; G06K 19/0717; G06K 19/0709; G06K 19/07773
See application file for complete search history.

(56) References Cited

U.S. PATENT DOCUMENTS

| 5,110,163 A | 5/1992 | Benson et al. |
| 5,305,510 A | 4/1994 | Croft et al. |

(Continued)

FOREIGN PATENT DOCUMENTS

| EP | 2851649 A1 | 4/2013 |
| EP | 2 921 242 A1 | 9/2015 |

(Continued)

OTHER PUBLICATIONS

International Search Report for corresponding International Application No. PCT/US2017/039769 dated Dec. 26, 2017.

(Continued)

*Primary Examiner* — Seung H Lee
(74) *Attorney, Agent, or Firm* — Pearne & Gordon LLP

(57) ABSTRACT

An energy harvesting RFID circuit is provided for taking measurements wirelessly. The RFID circuit receives an interrogation signal on an input lead from an antenna, and harvests energy which is stored in a charge storage unit that produces a harvested voltage. A boost converter then boosts the harvested voltage to a boosted voltage that is fed as an output voltage to a sensor output lead. A booster switching unit is also provided for activating the boost converter. The booster switching unit does not activate the boost converter until the voltage output by the charge storage unit reaches a first threshold value. Based on the output voltage, one or more sensor input leads receive a measurement input which reflects a sensed value of an object to be measured, such as the strain in a pipe fitting.

17 Claims, 5 Drawing Sheets

(56) References Cited

U.S. PATENT DOCUMENTS

| | | |
|---|---|---|
| 5,709,418 A | 1/1998 | Benson et al. |
| 6,131,964 A | 10/2000 | Sareshwala |
| 6,607,136 B1 | 8/2003 | Atsmon et al. |
| 6,692,040 B1 | 2/2004 | McKay et al. |
| 6,834,556 B2 | 12/2004 | Cain et al. |
| 7,090,030 B2 | 8/2006 | Miller |
| 7,158,034 B2 | 1/2007 | Corbett, Jr. |
| 7,575,257 B2 | 8/2009 | McKay |
| 7,616,119 B2 | 11/2009 | Corbett, Jr. |
| 8,004,414 B2 | 8/2011 | Angell et al. |
| 8,115,597 B1 | 2/2012 | Oliver et al. |
| 8,326,256 B1 | 12/2012 | Kuhn |
| 8,393,646 B2 | 3/2013 | Galle et al. |
| 8,428,676 B2 | 4/2013 | McKenna et al. |
| 8,439,404 B2 | 5/2013 | Anton et al. |
| 8,870,237 B2 | 10/2014 | Sindelar |
| 8,967,485 B2 | 3/2015 | Piazza et al. |
| 9,010,810 B2 | 4/2015 | Anton et al. |
| 9,166,405 B2 | 10/2015 | Brandt et al. |
| 9,378,448 B2 | 6/2016 | Ching et al. |
| 9,400,070 B2 | 7/2016 | Anton et al. |
| 9,627,967 B2 | 4/2017 | Mallik et al. |
| 10,176,416 B1* | 1/2019 | Lektomiller ..... G06K 19/07773 |
| 2006/0202821 A1 | 9/2006 | Cohen |
| 2006/0250245 A1 | 11/2006 | Forster |
| 2007/0276201 A1 | 11/2007 | Lee et al. |
| 2008/0252459 A1 | 10/2008 | Butler et al. |
| 2011/0181399 A1 | 7/2011 | Pollack et al. |
| 2011/0287713 A1 | 11/2011 | Ali et al. |
| 2012/0126008 A1 | 5/2012 | Binmore |
| 2013/0056538 A1 | 3/2013 | Binmore |
| 2014/0000386 A1 | 1/2014 | Malhan et al. |
| 2014/0360279 A1 | 12/2014 | Jenkins |
| 2015/0054621 A1 | 2/2015 | Lin et al. |
| 2015/0139715 A1 | 5/2015 | Exner et al. |
| 2016/0241999 A1* | 8/2016 | Chin ..................... H04W 4/021 |
| 2016/0275319 A1 | 9/2016 | Ching et al. |
| 2017/0089496 A1 | 3/2017 | Lennon |

FOREIGN PATENT DOCUMENTS

| | | |
|---|---|---|
| WO | 2008/005547 A2 | 1/2008 |
| WO | 2009/122166 A2 | 10/2009 |
| WO | 2013/116087 A1 | 8/2013 |
| WO | 2013/168720 A1 | 11/2013 |
| WO | 2015/099763 A1 | 7/2015 |

OTHER PUBLICATIONS

Written Opinion for corresponding International Application No. PCT/US2017/039769 dated Dec. 26, 2017.

Maxwell, et al.; "GMC 2013: Piping Misalignment and Vibration Related Fatigue Failures;" www.BetaMachinery.com; dated Nov. 1, 2013; pp. 1-10.

Swedberg; "Campbell Uses RFID Sensor Tags to Test Cooking Equipment;" RFID Journal; dated Jun. 5, 2015; pp. 1-2.

International Preliminary Report on Patentability for corresponding International Application No. PCT/US2017/039769 dated Dec. 31, 2019.

* cited by examiner

ENERGY HARVESTING RFID CIRCUIT, ENERGY HARVESTING RFID TAG, AND ASSOCIATED METHODS

CROSS-REFERENCE TO RELATED APPLICATIONS

This application is a continuation application of application Ser. No. 15/636,263, filed 28 Jun. 2017, the entire disclosure of which is hereby incorporated herein by reference.

FIELD OF THE INVENTION

The present application relates generally to passive radio-frequency identification (RFID) sensor tags and methods for monitoring objects with passive RFID sensor tags.

BACKGROUND OF THE INVENTION

Radio-frequency identification (RFID) is a technology that uses communication via radio frequency (RF) waves to exchange data between a "reader" (or "interrogator") and an electronic RFID "tag" (or "transponder") which is attached to (or otherwise associated with) an object being monitored (OBM) (or "tracked object"), usually for purposes such as identification and tracking. The tag may interface with a sensor that produces information such as a sensor reading relating to the tracked object. Either or both of the RFID tag and its sensor may be at least partially embedded in the tracked object.

RFID tags generally comprise at least two parts, namely: an integrated circuit (IC) for storing and processing information, modulating and demodulating a radio-frequency (RF) signal and other specialized functions, and an antenna (ANT) for receiving and transmitting and receiving signals, such as from an external reader (or interrogator). Generally, at least the IC portion of the tag may be enclosed in some kind of housing.

There are two main types of RFID tags: passive and active. Active RFID tags are also referred to as "battery assisted".

Passive RFID tags have no power source (no battery) and require an electromagnetic field from an external source (such as the reader) to power the tag electronics and initiate a signal transmission. In the context of a passive tag, "transmission" may mean modulating an impedance or resonance of an antenna, such as simply shorting or not shorting the antenna, resulting in "backscatter". These modulations of the antenna can be sensed by the external reader. An antenna may be a coil in a low frequency (LF) or high frequency (HF) magnetic field coupled system or an ultra-high frequency (UHF) dipole in an electric field coupled system. Passive RFID tags can also energize a sensor circuit, when power is being supplied to the tag by the external reader. Passive RFID tags in the LF or HF range often require powerful readers because of powering limitations of magnetic field coupling which falls off dramatically. The coupling corresponds to $1/r^3$, with 1 being signal power and r being distance between tag and reader.

Battery assisted RFID tags, on the other hand, include a battery and a transmitter, and can transmit signals to an external reader. In contrast to the passive RFID tags, battery assisted RFID tags derive all their circuit power from the battery. Similar to passive RFID, communication is still achieved using the backscatter method described above. The range of battery assisted RFID typically exceeds that of passive RFID because the power needed from the reader is only what is necessary for the communication link. Battery power is also used to provide a stable supply for sensor sampling. Battery assisted devices that are RFID enabled can therefore make measurements, such as temperature, independently of the reader. The transmissions may occur at periodic intervals, independent of whether there is an external reader nearby (since the reader is not needed to power the active circuit), or the tag may transmit in response to a query (request for the tag to transmit) by the external reader.

In various applications, it is useful to take measurements on an object to be measured (OBM) at periodic intervals such as daily, weekly, monthly, quarterly, bi-annually or annually. This is the case for health monitoring of many types of structures, for example pipelines, bridges, ships, aircraft, oil rigs, oil storage tanks, buildings and the like.

Often, parts of the OBM are not readily accessible after installation (for example: buried foundations, under water, inside tanks, etc.) or are otherwise difficult or inconvenient to measure. Therefore, it is desirable to provide a wireless interface with the measurement sensor circuitry. This allows measurements to be taken without requiring physical contact with the sensor, which may not be possible due to the location or accessibility of the OBM.

However, in applications in which sensed measurements are transmitted wirelessly, it has proven difficult to provide an on-board power supply that can power the sensor and its associated circuitry such as a transponder over the entire lifespan of the OBM. A first reason for this is that it may not be possible to access the sensor and/or the transponder circuitry so as to recharge or replace a faulty or depleted power supply. A second reason for this is that the OBM may have a compact or flat profile, and therefore it may be undesirable to add a bulky power supply to the otherwise compact sensor circuitry. Further disadvantages of batteries for this type of application are also known; for example, periodic power draws on batteries with long intervals of "down time" during which no power is drawn can drastically reduce the performance of certain types of batteries.

As a consequence, it is known to provide a wireless sensor such as an RFID sensor that is passively powered. Passive RFID tags collect energy from a nearby RFID reader's interrogating radio waves. The RFID tag uses collected energy to perform operations such as taking measurements from a sensor and transmitting those measurements to the external RFID reader. In this way, an RFID sensor can be provided that does not require an on-board battery, so that the disadvantages associated with batteries may be avoided.

U.S. Pat. No. 9,378,448 "RFID Sensor Tag and System for Small Output Transducers, and Related Methods", the entire disclosure of which is incorporated herein by reference, describes a passive RFID tag may be provided to measure a strain. Using passive RFID, such measurements can be periodically conducted over long time periods, such as the lifespan of the associated structure.

BRIEF SUMMARY OF THE INVENTION

In accordance with a first aspect, an energy harvesting RFID circuit is provided for taking measurements. The RFID circuit receives an interrogation signal on an input lead from an antenna, and harvests energy which is stored in a charge storage unit. A boost converter then boosts the harvested voltage to a boosted voltage that is fed as an output voltage to a sensor output lead. A booster switching unit is also provided for activating the boost converter. Specifically, the booster switching unit does not activate the boost converter until the voltage output by the charge storage unit reaches a first threshold value. Based on the output voltage, one or more sensor input leads receive a measurement input which reflects a sensed value such as the strain in a pipe fitting.

In accordance with another aspect, an energy harvesting RFID tag is provided with the energy harvesting RFID circuit of the first aspect. The RFID tag also has an antenna that provides the antenna input, and a sensor that receives the output voltage of the energy harvesting RFID circuit and produces the measurement input.

In accordance with further aspect, of monitoring an object is provided. According to the method, an interrogation signal is received from an RFID reader with an antenna of an RFID tag. Next, an induced voltage created from a current induced by the interrogation signal is transformed into a supply side voltage. The induced voltage is input to a charge storage unit. When a charge from the charge storage unit exceeds a first threshold, a boost converter is selectively activated to produce a boosted voltage. The boosted voltage is then provided to a sensor in order to obtain a sensor reading based on the boosted voltage and a sensed value. Finally, the sensor reading is transmitted from the antenna back to the RFID reader.

BRIEF DESCRIPTION OF THE DRAWINGS

The foregoing and other aspects of the present invention will become apparent upon reading the following description with reference to the accompanying drawings, in which.

DESCRIPTION OF EXAMPLE EMBODIMENTS

Figure 1:
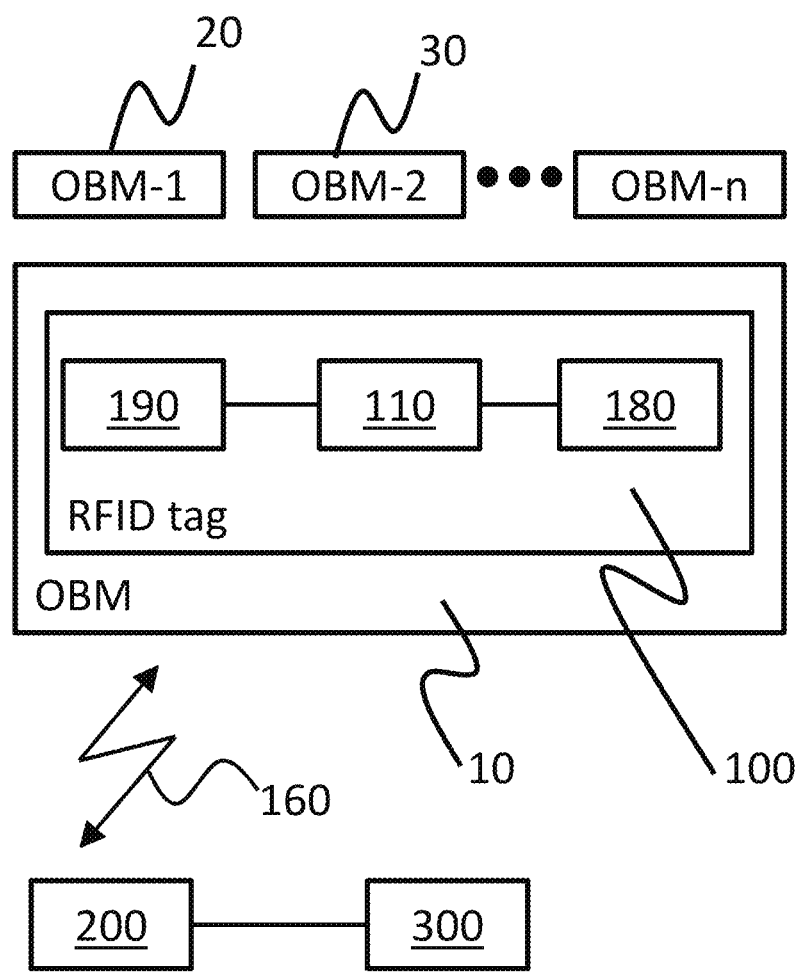
FIG. 1 is a schematic view of an RFID system comprising RFID sensor tags according to a first embodiment.

Example embodiments that incorporate one or more aspects of the present invention are described and illustrated in the drawings. The same reference numerals are employed for designating the same elements.

As used herein, "energy harvesting" (also known as power harvesting or energy scavenging, or energy gathering) may refer to a process by which electrical energy is derived from external sources, captured, and stored. Energy harvesting may specifically refer to electromagnetic ("RF") energy harvesting, in which an RF field generated by a transmitter is coupled with a tuned coil or e-field antenna in a receiver. Alternatively, "energy harvesting" may refer to thermal or vibration energy harvesting.

As used herein, a "sensor" is the complete assembly required that both detects and communicates a sensed event, while a "transducer" is the element within that assembly which accomplishes only the detection of the event. In this application these terms are used interchangeably.

Turning to the example shown in FIG. 1, a first object to be measured (OBM) 10 is shown alongside other objects to be measured OBM-1 20, OBM-2 30, up to OBM-n. As illustrated with respect to OBM 10, each object to be measured comprises an RFID tag 100.

The RFID tag 100 may be located on, partially within, or entirely within the OBM 10. The RFID tag 100 comprises an antenna 190, sensor circuitry 110, and one or more sensors 180. These components of the RFID tag 100 function together so as to measure and, optionally, temporarily store information measured by the sensor 180. The components of the RFID tag 100 further function together so as to transmit the measured information along with a unique identification (ID) number associated with the OBM to an RFID reader 200. Importantly, the sensor 180 of the RFID tag 100 is located at a proximity to the sensed portion of the OBM 10 that allows that portion to be sensed. The antenna 190, circuitry 110 and sensor 180 are preferably provided together on a single substrate, although other configurations with various combinations of components on separate, interconnected substrates are also contemplated.

The sensor 180 can comprise one or more of the following: any resistive sensor or transducer, including bridge devices; devices that create a voltage such as piezo sensors; thermocouples, microphones, thermo-electric generators, photo-electric cells, and the like; capacitive sensors; pressure sensors; fluid flow sensors; fluid leak sensors; vibration sensors; and other such sensor or transducer types. In this way, one or more conditions in or around the OBM 10 can be sensed, such as light, temperature, magnetic field, humidity, vibration, pressure, electrical field, motion or sound. The sensor 180 may detect a property of a portion of the OBM 10 itself, such as strain, temperature, or electrical characteristics. Due to the low power available from the RF source in passive sensor tags, it is best to use transducers with high impedance to lower power consumption. However, high impedance sensors have small signal outputs and are therefore more susceptible to electrical noise.

The RFID tag 100 has a unique ID number. The anti-collision capability afforded by most RFID protocols allows for many RFID tags 100 to be "in the radio field" and read by one RFID reader 200. This allows for many RFID tags 100 to be installed in a small area and be read simultaneously by a single RFID reader 200 for automated monitoring.

In some embodiments, the RFID tag 100 may be provided without a sensor 180, so that the tag is used for alternative purposes, such as the identification of an object or structure and not for the purposes of measuring a characteristic of the object or structure.

The RFID tag 100 is preferably provided within a housing, such as a fully sealed housing, to protect against the intrusion of dust particles, air, liquid, and/or corrosive chemicals, and also optionally to provide a degree of thermal insulation. The housing may be affixed to the OBM 10, or may be partially or fully embedded within the OBM 10. Optionally, the housing may have an opening for a portion of the sensor 180 such as a probe. The opening may be sealed around the probe leads.

FIG. 1 also shows that the RFID tag 100 communicates via a wireless RFID interface 160 with an actively powered RFID reader 200, in what is known as a high-frequency near field communication (HF-NFC) system. The RFID reader 200 may, for example, operate at 915 MHz and have 50 channels, which variously supply energy based on factors such as the distance and relative location between the RFID reader 200 and the RFID tag 100. Alternatively, another known HF-NFC that operates at a different frequency or frequency band, such as 13.56 MHz, could be used. In any case, the RFID reader 200 transmits interrogator signals and also receives authentication replies from the RFID tag 100, via the interface 160. Specifically, the RFID tag 100 uses its antenna 190 both to receive the interrogator signals and harvest energy from the RFID reader 200 and to transmit its replies to the RFID reader 200 via the wireless interface 160.

Finally, as shown in FIG. 1, the RFID reader 200 may be intermittently or continuously connected to one or more system supervisory devices 300 such as a PC or a datacenter. According to one possible implementation, the system supervisory device 300 may not be tied to a particular device or processor, but may be implemented with cloud computing or other distributed processing services. The connection between the RFID reader 200 and the system supervisory device 300 may be a wireless connection, such as Wi-fi or Bluetooth, or a hardwired connection, for example implemented on known IP protocols via ethernet or coaxial cable.

In operation, the RFID reader 200 interrogates the RFID tag 100. Via its antenna 190, the RFID tag 100 harvests energy to perform a measurement, and activates its circuitry 110. The circuitry 110 in turn activates the sensor 180, which produces one or more measurement data. The measurement data are forwarded via the circuitry 110 and antenna 190 of the RFID tag 100 over the RFID interface 160 to the RFID reader 200, which may temporarily store the measurement data or forward them directly to the system supervisory device 300 for processing.

After the RFID tag 100 is read by the RFID reader 200, the real-time sensor data, along with any control signals that were sampled at the same time as the sensor data as well as ID information for identifying the RFID tag 100, are transmitted to the RFID reader 200 and ultimately to the system supervisory device 300. The system supervisory device 300 uses these data to calculate the actual value of the sensed parameter. The system supervisory device 300 may perform post-processing on the measurement data. The measurement data may also be stored in raw or processed form on the system supervisory device 300 for further data analysis and/or data compilation purposes.

In practice, the RFID reader 200 may perform some of the functions described herein as belonging to the system supervisory device 300, and vice versa. Indeed, the RFID reader 200 and system supervisory device could in some cases be implemented as a single unit, or as more than the two units described, with functions associated with either one or both of these devices being distributed over two or more devices.

Figure 2A:
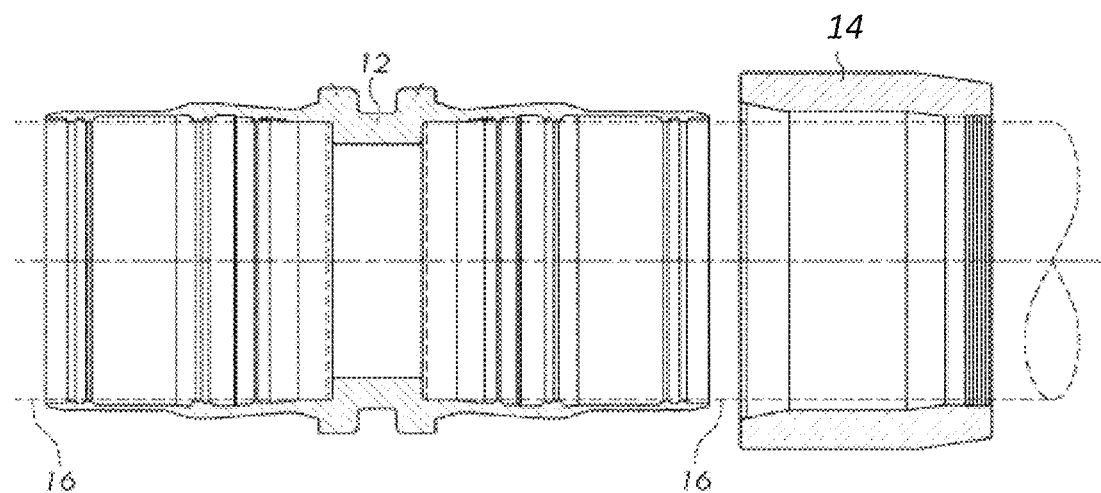
FIG. 2A is cross-section of an example pipe fitting for joining and sealing together pipes, to provide context for an example application for an RFID sensor tag according to a second embodiment.
Figure 2B:
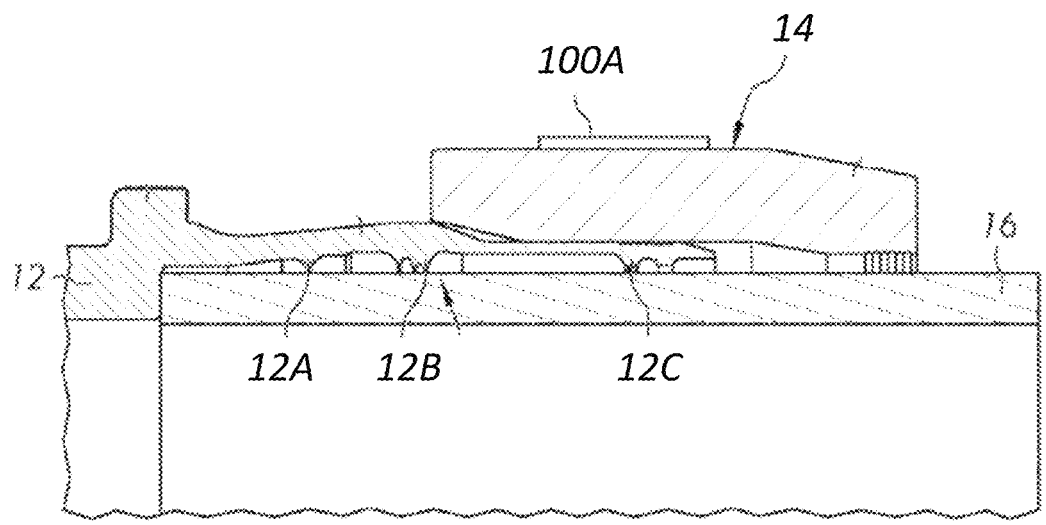
FIG. 2B is a magnified cutaway of a portion of the pipe fitting shown in FIG. 2A, with a drive ring comprising an RFID sensor tag according to the second embodiment.

FIGS. 2A-2B show an application for an energy harvesting RFID tag 100A according to a second embodiment. The application is a pipe fitting for mechanically attaching and sealing sections of pipe together, as described in U.S. Patent Application Publication number 2017/0089496 A1, "Pipe Fitting with Sensor", the entire disclosure of which is herein incorporated by reference.

As shown in FIG. 2A, a pipe 16 is provided for the transport of process fluids such as natural gas, petroleum, air, water, or other liquid or gaseous compositions or mixtures. In particular, the process fluid may contain corrosive elements such as hydrogen sulfide, which is known to be damaging to carbon steel pipelines. The pipe 16 is preferably made of steel or another metal, although alternative embodiments could provide the pipe 16 in other materials or compounds in pure or composite form such as PVC or another polymer.

In order to join the pipe 16 to a further section of pipe, a pipe fitting 12 is provided. As shown in FIG. 2B, an inner profile of the pipe fitting provided with sealing ridges 12A, 12B, 12C. The sealing ridges 12A, 12B, 12C abut against an outer portion of an end of the pipe 16. An outer profile of the pipe fitting 12 may have a shoulder, joining a relatively thinner portion of the pipe fitting 12 to a relatively thicker portion of the pipe fitting 12. The pipe fitting 12 may be made of a high-strength plastically deformable material such as steel, copper or other metal.

As shown in FIGS. 2A and 2B, a drive ring 14 is also provided. In order to join the pipe 16 to the pipe fitting 12, the drive ring 14 is driven, for example by a hydraulic press, axially onto the pipe fitting 12 into a final installed position. Installation of the drive ring 14 upon the pipe 16 causes permanent, irreversible deformation to the pipe 16, providing a metal-to-metal seal between the pipe 16 and the pipe fitting 12. When the drive ring 14 is axially forced onto the pipe fitting 12 with the pipe 16 received therein, the sealing ridges 12A, 12B, 12C of the pipe fitting become mechanically connected to and sealed with the pipe 16 in a non-leaking manner. The drive ring 14 is sized to be annularly received over and axially forced along the outer circumference of pipe fitting 12 in order to force the sealing ridges 12A, 12B, 12C to bite into the pipe 16 to seal and mechanically connect the pipe fitting 12 with the pipe 16.

As shown in FIG. 2B, one or more energy harvesting RFID tags 100A is installed on the drive ring 14. This allows the strain within the drive ring to be monitored, for example during installation of the pipe fitting as well as over its useful lifetime. The energy harvesting RFID tag 100A may be installed atop the drive ring 14, or be partially embedded or fully embedded into an outer surface of the drive ring 14. When interrogated by an RFID reader, the energy harvesting RFID tag 100A provides a measurement of the strain within the drive ring 14.

If the strain measurement is within certain bounds delineated by a lower and upper threshold, this can indicate that the drive ring 14 is in good condition. However, if the strain measurement is out of bounds, this can serve as an indication that the drive ring 14 and fitting 12 should be checked or replaced. Interrogations by an RFID reader 200 may therefore be performed at regular or irregular intervals. For example, interrogations may be performed periodically as part of normal maintenance. Further interrogations may be performed during system checks when the pipeline is down, as well as at the start of operations, or before, during or after stressful or abnormal operating conditions.

The development of the RFID tag 100A of the second embodiment presented an engineering challenge in that an extremely stable, relatively high voltage must be produced by the RFID tag 100A in order to produce reliable strain measurements. Strain transducers for metallic structures are typically metal film resistance devices, and can be extremely sensitive to changes in their input voltage. These transducers typically produce a very small electrical resistance change in response to the movement (strain) of the structure to which they are attached, resulting in a very small output signal on the order of tens of microvolts. Specifically, the drive ring 14 is typically made of a high-strength material, and therefore the strain values being sensed are typically very small values, on the order of 0.001% to 0.01%, and the resistance changes are therefore also very small. As a result, very slight oscillations in the input voltage due to interference with the interrogation signal from a nearby RFID reader can translate to unreliable strain measurements. In other words, if the voltage input to the strain gauge contains even slight oscillations, this can cause the strain measurements to become indistinguishable from background noise.

Figure 4:
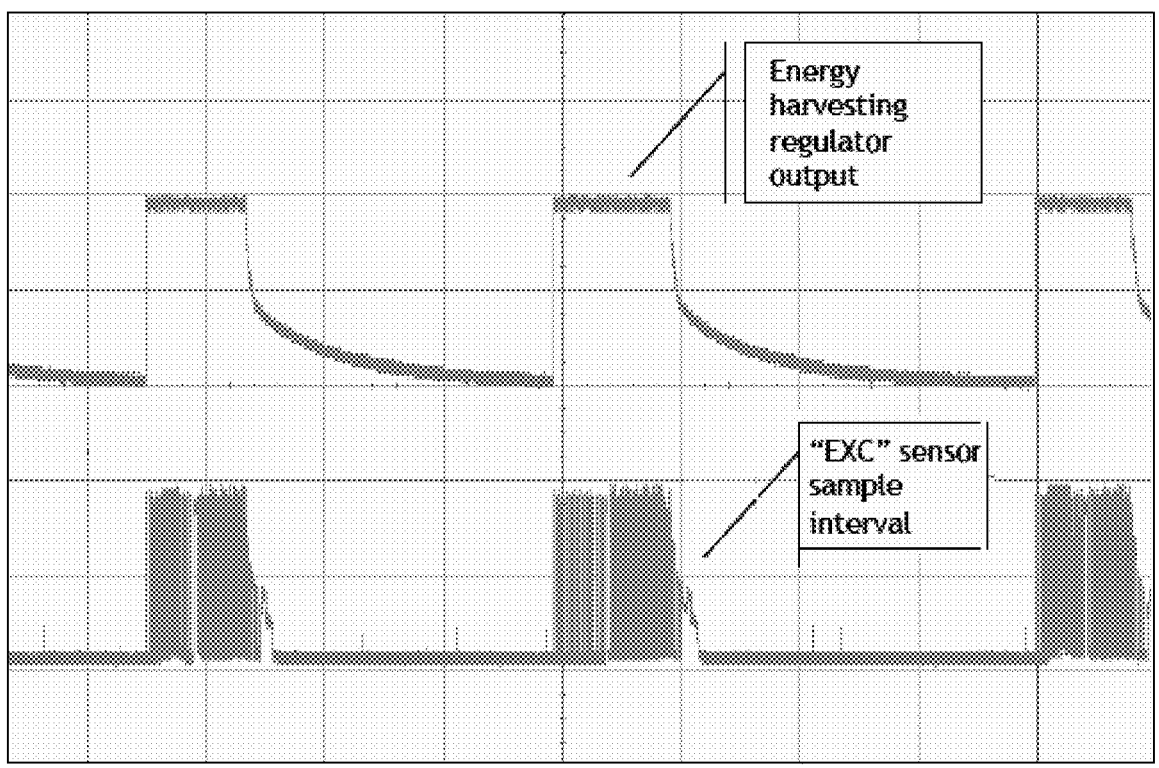
FIG. 4 is a graph showing the energy harvesting regulator output compared to the sampling interval for a circuit that is continuously powered.

The above problems are compounded by the fact that passively powered RFID tags typically run on low voltage, as the RFID tag 100 must harvest all the energy that it uses to run from the incoming interrogation signal provided by the RFID reader 200. Therefore, if the sensor 180 is powered continuously, the harvested energy is quickly drained. This can result in a long lag time between measurements, as the energy stored within the RFID tag 100 must first be replenished by the RFID reader 200 before a new measurement cycle can begin. This is illustrated in FIG. 4, which was measured on a circuit that was allowed to continuously power its sensor 180. The top trace shows the output of the energy harvesting circuit. The bottom trace shows the activation signal for performing a measurement or sensor reading. The time base in FIG. 4 is 2 seconds/division, and it can be seen that there are up to 6 seconds of charge time between the energizing of the harvester circuit.

A final consideration is that even after the harvested signal has been rectified by the RFID tag 100, typically the rectified voltage still contains significant oscillations, due to interference from the high-powered signal put out by the nearby RFID reader 200. The RFID reader 200 operates across a band of 50 channels. The RFID tag antenna 190 is not efficient at collecting energy on all channels. This results in noise on the rectified voltage leading to unreliable sensor measurements. In other words, the RF energy beamed at the sensor tag by the RFID reader 200 induces additional currents on the circuit traces and components of the RFID tag 100 which creates unwanted oscillations (electrical noise) which makes it even more difficult to detect the small signal changes of the sensor 180A. Even these slight oscillations in the voltage input to the sensor 180A can translate to unreliable strain measurements. Furthermore, the variation of the distance between RFID reader 200 and RFID tag 100 can cause variation in the level of the rectified supply that, if not properly accounted for, can cause further measurement error.

Figure 3:
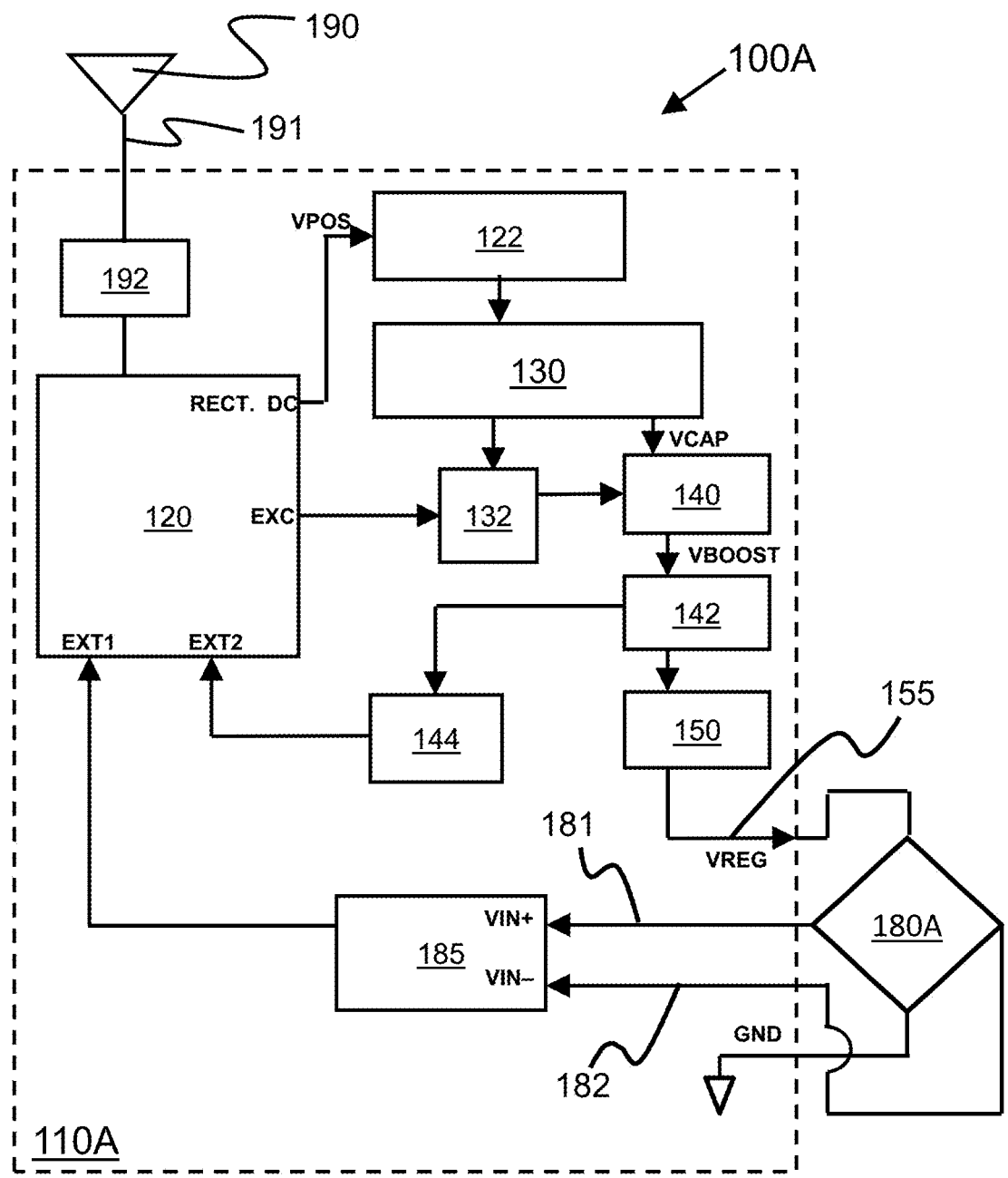
FIG. 3 is a schematic view of an energy harvesting RFID tag for performing strain measurements according to the second embodiment.

An energy harvesting RFID tag 100A according to a second embodiment was designed in response to the challenges described above. As shown in FIG. 3, the energy harvesting RFID tag 100A according to the second embodiment broadly matches first embodiment, in that the RFID tag 100A comprises an antenna 190, an energy harvesting RFID circuit 110A, and a strain sensor 180A also known as a strain gauge. The energy harvesting RFID circuit 110A provides a very stable, boosted voltage $V_{REG}$, that is needed in order to make accurate strain measurements.

The strain sensor 180A is preferably stably affixed to the drive ring 14 or other object to be measured, for example by partially or fully embedding a strain sensitive pattern of the strain sensor 180A within the drive ring 14 or other object to be measured.

The energy harvesting RFID circuit 110A and antenna 190 are preferably provided in proximity to the strain sensor 180A and the RFID circuit 110A is hardwired to the strain sensor 180A as shown in FIG. 3. As described with respect to the first embodiment, the elements of the RFID tag 100A are preferably provided within a housing that is affixed to or partially or fully embedded within the object to be measured.

As shown in FIG. 3, interrogation signals picked up by antenna 190 are input via antenna lead 191 to energy harvesting RFID circuit 110A. The antenna 190 may be tuned to a given frequency, such as 915 MHz and converts electromagnetic fields at this frequency to a usable alternating current (AC) voltage. A typical ac voltage from the antenna 190 may be 4 vac p-p.

The AC voltage is fed via the antenna lead 191 through an impedance matching network 192. The impedance matching network 192 may comprise a matched LC circuit comprising one or more inductors and one or more matching capacitors, so as to provide maximum power transfer. The impedance matching network 192 provides the matched input signal to an RFID transponder chip 120. In certain embodiments, the impedance matching network 192 may be omitted, so that the antenna lead 191 feeds directly through to the RFID transponder chip 120.

The RFID transponder chip 120 receives the matched input signal and produces a rectified DC output $V_{POS}$, which may have a relatively low voltage such as less than 1.2 V DC, depending on the strength of the interrogation signal received the by antenna 190. Furthermore, the rectified DC output $V_{POS}$ can also be subject to oscillations and/or instability. In order to obtain a more stable and continuous voltage supply, the energy harvested from the interrogation signal is therefore input into a charge storage unit 130, which temporarily stores the harvested energy.

Before the rectified DC output $V_{POS}$ is fed to the charge storage unit 130, first it passes through a regulating unit 122, which regulates and isolates the charge. Specifically, the regulating unit 122 may comprise one or more resistors for regulating the current. In addition or alternatively, the regulating unit 122 may comprise one or more diodes to prevent back current on the $V_{POS}$ terminal of the RFID transponder chip 120, as excessive back current could damage the RFID transponder chip 120 and cause unstable operation. In certain embodiments, the regulating unit 122 may be omitted, so that the rectified DC output $V_{POS}$ feeds directly through to the charge storage unit 130.

The charge storage unit 130 may comprise a single capacitor or a bank of capacitors, with a combined output voltage $V_{CAP}$. The bank of capacitors may be in the form of a capacitor network, and the capacitors may be connected to each other in parallel or in series.

Charge accumulates in the charge storage unit 130 as long as an interrogation signal is present, until the charge storage unit 130 is at or near a fully charged state. When charge is drained from the charge storage unit 130 due to a sensor measurement being taken, the capacitor bank will subsequently recharge as long as an interrogation signal continues to be present. In other words, the charge storage unit 130 continues to charge during operation until full.

The charge storage unit 130 produces, at its output, a harvested voltage $V_{CAP}$. Although the harvested voltage $V_{CAP}$ is relatively stable as long as sufficient charge remains in the capacitor bank, initially the harvested voltage $V_{CAP}$ is not a sufficiently high voltage for performing strain sensor readings. Once the charge storage unit 130 has accumulated sufficient charge, the harvested voltage $V_{CAP}$ is clamped to an optimum voltage for a DC/DC boost converter 140. The DC/DC boost converter 140 takes the harvested voltage $V_{CAP}$ as an input, and outputs a boosted voltage, $V_{BOOST}$. However, due to power requirements of the boost converter 140, it has been found to be advantageous to leave the boost converter 140 off until shortly before a strain measurement is to be taken. In other words, it is advantageous to prevent the harvested energy stored in the charge storage unit 130 from being drawn off by operation of the boost converter 140 even when no strain measurement is being taken.

Therefore, the boost converter 140 is controlled by a booster switching unit 132, which normally ensures that the boost converter 140 remains off. When an external RFID reader 200 interrogates the RFID tag 100A by transmitting an interrogation request via antenna 190, the RFID transponder chip 120 outputs an execute measurement signal on its EXC pin. This activates the booster switching unit 132, which checks whether the charge storage unit 130 is sufficiently charged. For example, booster switching unit 132 may compare $V_{CAP}$ to a first predefined threshold, such as 0.9V. Only when $V_{CAP}$ reaches the first threshold, can the booster switching unit 132 cause the boost converter 140 to be turned on. If the RFID transponder chip 120 receives an interrogation request before the capacitor bank is sufficiently charged, then the boost converter 140 is left in an off state by the booster switching unit 132. Attempting to obtain a strain measurement when the charge storage unit 130 is insufficiently charged merely drains the charge storage unit 130 and does not result in a reliable strain measurement, as already discussed with respect to FIG. 4.

The boosted voltage $V_{BOOST}$ is sufficiently high to conduct very precise measurements such as strain gauge measurements. However, due to interference from the nearby RFID reader, the boosted voltage $V_{BOOST}$ may not be sufficiently smooth to obtain reliable measurements. Therefore, a reference regulator 150 is provided to smooth the boosted voltage $V_{BOOST}$. However, to prevent the reference regulator 150 from unnecessarily consuming power, it has been found to be advantageous to leave the reference regulator 150 off until shortly before a strain measurement is to be taken.

Therefore, a regulator switching unit 142 is provided that compares the boosted voltage $V_{BOOST}$ to a second predefined threshold, such as 1.9V for example, and only switches on when the second threshold has been reached. The regulator switching unit 142 may be implemented as a transistor that switches off when the boosted voltage falls below the second predefined threshold, thus and preventing the boosted voltage from being put through to supply the reference regulator 150 when the boosted voltage falls below the second predefined threshold. When the regulator switching unit 142 is switched on, $V_{BOOST}$ is fed through the regulator switching unit 142 to the reference regulator 150.

However, before the regulator switching unit 142 is switched on, the reference regulator 150 outputs an indeterminate voltage, sometimes called a 'floating' voltage. In case the strain sensor 180A is queried and a reading of the strain sensor 180A is performed while the reference regulator 150 is still outputting this undefined, floating voltage, this can result in a sensor reading that is believable but false. In order to prevent believable but false readings of the strain sensor 180A from being interpreted as real readings, a boost detect unit 144 is provided to signal when readings of the strain sensor 180A are valid.

This is accomplished as follows. When the regulator switching unit 142 turns the reference regulator 150 on, so that the output voltage $V_{REG}$ is provided, the regulator switching unit 142 sends a control signal to the boost detect unit 144, indicating that the sensor readings are reliable. The boost detect unit 144 feeds a forwarded control signal through to the RFID transponder chip 120. The forwarded control signal may be read in on pin EXT2 as an A/D input, where certain values of the forwarded control signal within a range of possible values serve to indicate that the reference regulator 150 is on. This, in turn, indicates that the output voltage $V_{REG}$ is being provided to output lead 155, and therefore the strain sensor 180A is producing valid readings. This provides a safeguard so that believable but false readings of the sensor 180A are not interpreted as valid readings.

The reference regulator 150 may comprise a shunt regulator and an RC filter, in order to provide the extremely stable, relatively high output voltage $V_{REG}$ needed for accurate strain measurements to be taken. The smoothed, boosted output voltage $V_{REG}$ is provided by the RFID circuit 110A on the sensor output lead 155 to the strain sensor 180A. Once the output voltage $V_{REG}$ is put through to the output lead 155, measurements obtained from the strain sensor 180A reflect true strain measurements.

Based on the smoothed, boosted voltage $V_{REG}$, the strain sensor 180A produces strain measurements VIN+, VIN−, which are input to sensor conditioning unit 185. The sensor conditioning unit 185 may amplify the measured values VIN+, VIN− and/or apply an offset to them. The sensor conditioning unit 185 produces an output that is read into the RFID transponder chip 120 as an A/D input on pin EXT1. The sensor conditioning unit's amplified, increased dynamic range, and voltage adjusted input to the transponder chip 120 can improve measurement accuracy by enabling operation near the center of the A/D range. Alternatively, the sensor conditioning unit 185 can adjust the operation to any desired range, such as a modified range that is offset from the center of the A/D range.

The digitized values of EXT1, representing a strain measurement, and EXT2, representing an indication of whether the measurement is valid, are packaged together, preferably along with the ID associated with RFID tag 100A, and transmitted via antenna 190 to an external RFID reader 200. The RFID reader 200 may cull invalid readings, or pass the unprocessed data directly on to a system supervisory device 300.

Based on the above description, one example method of operation of the RFID tag 100A will be described. When approached by an external RFID reader 200, the antenna 190 picks up an interrogation signal and the RFID transponder chip 120 uses the harvested energy to begin producing a rectified DC voltage $V_{POS}$. This is fed via the regulating unit 122 to the charge storage unit 130, which begins to accumulate charge. Depending on the proximity of the RFID reader 200 to the RFID tag 100A, the charge storage unit 130 may be fully charged typically within a period of time such as less than a second, a few seconds, or a few minutes.

A measurement cycle can be initiated by the RFID reader 200, which transmits an interrogation request which is received via the antenna and processed by the RFID transponder chip 120. The RFID transponder chip 120 then outputs an activation signal EXC to the booster switching unit 132. The booster switching unit 132 checks whether the voltage $V_{CAP}$ provided by the charge storage unit 130 has reached a first threshold level. If so, the booster switching unit 132 activates the boost converter 140, which in turn produces a boosted voltage $V_{BOOST}$. Once the boosted voltage $V_{BOOST}$ reaches a second threshold level (which is higher than the first threshold level), the regulator switching unit 142 outputs a control signal via boost detect unit 144 to the EXT2 pin of the RFID transponder chip 120. At the same time, the regulator switching unit 142 allows the boosted voltage $V_{BOOST}$ to be put through to the regulator 150, which smooths and filters the voltage. The resulting voltage $V_{REG}$ serves as a reference voltage for the strain sensor 180A.

Based on the reference voltage $V_{REG}$, the strain sensor 180A produces strain measurements VIN+, VIN−. These are conditioned by sensor conditioning unit 185, and the result is fed through to the A/D input pin EXT1 of the RFID transponder chip 120.

The RFID transponder chip 120 samples inputs EXT1 and EXT2, and outputs these values, preferably along with the ID associated with RFID tag 100A, via antenna 190 to RFID reader 200. The RFID reader 200 checks whether EXT2 is within range, thus indicating that the value of EXT1 represents a true strain measurement, and not merely a believable but false value. If EXT2 indicates that the measurement is valid, then EXT1 is saved or recorded, either locally on the RFID reader 200 or at system supervisory device 300. Peripheral data such as a timestamp and other information associated with the reading may be saved as well. On the other hand, if the value of EXT2 indicates that the measurement is not valid, then the pair of inputs EXT1, EXT2 may be discarded, either by deliberate deletion or by allowing the data to be overwritten.

When the RFID reader 200 ceases to output the activation signal, the RFID transponder chip 120 discontinues its activaction signal on EXC. Consequently, the boost converter 140, regulator switching unit 142 and regulator 150 all become inactive, thus preventing charge from unnecessarily being drawn off from the charge storage unit 130. The charge storage unit 130, meanwhile, continues to charge in the background using energy harvested from the interrogation signal, until the charge storage unit 130 is fully recharged. A new measurement cycle can begin before the charge storage unit 130 is fully charged, provided that the harvested energy stored within the charge storage unit 130 causes $V_ey$ to reach the first threshold.

Returning to the application of the second embodiment illustrated with reference to FIGS. 2A-2B, the operation of the RFID tag 100A with respect to the pipe fitting 12, 14, 16 will now be described. During installation of the drive ring 14, the RFID reader 200 may collect multiple samples at short intervals, such as every tenth of a second or every second. The energy harvesting capabilities of the RFID tag 100A allow enough charge to be collected to accomplish multiple readings at short intervals. When performing maintenance checks over the lifetime of the OBM, fewer readings such as one reading, two readings, or several readings may be taken by the RFID reader 200, for example in order to produce an averaged measurement for that maintenance check.

Figure 5:
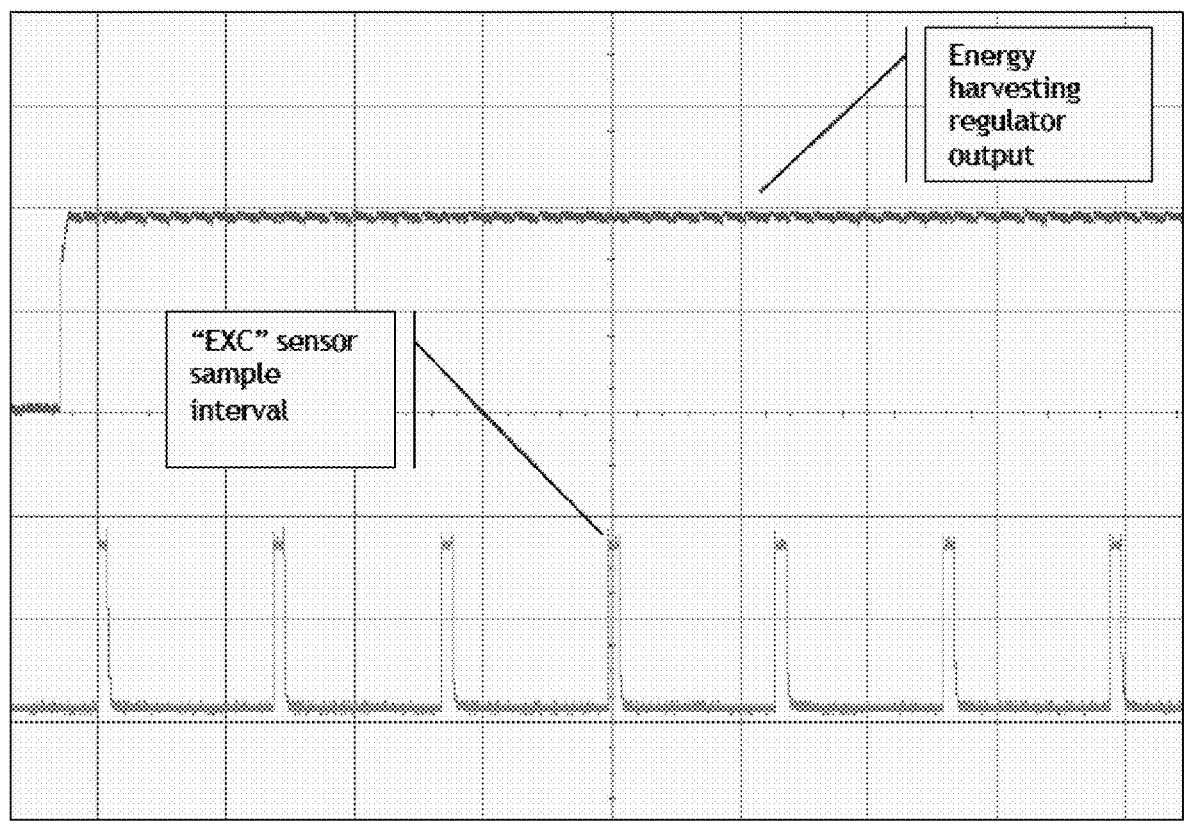
FIG. 5 is a graph showing the energy harvesting regulator output compared to the sampling interval for a circuit that powers the sensor only when the RFID tag is being read.

In summary, the strain sensor 180A is only powered while the RFID tag 100A is being read. This has the effect shown in FIG. 5 that energy is saved by activating the energy harvester circuit only during the sensor sample event. The top trace shows the output of the energy harvesting circuit. The bottom trace shows the activation signal for performing a measurement or sensor reading. The time base in FIG. 5 is 20 milliseconds/division. A single measurement only takes 4 to 5 milliseconds to complete. As a consequence of the energy savings, a new measurement can be performed every 25 milliseconds. This represents a great improvement over FIG. 4, as frequent measurements may be advantageous in some applications, such as during installation of the drive ring 14 of the pipe fitting described with reference to FIGS. 2A and 2B.

In addition to being able to monitor strain, the techniques disclosed herein may be applicable to many other types of transducers such as pressure transducers, highly accurate temperature sensors such as RTDs (resistance temperature detectors), thermistors, proximity sensors, humidity sensors, light detectors (photo cells) and the like. In these embodiments the strain transducer can be replaced with the other transducer with minor changes in the circuitry and packaging.

In modifications of the described embodiments, the energy harvesting RFID tag may be provided without a sensor or transducer, so that the energy harvesting RFID tag is used mainly for identifying a building, structure, or item with which the RFID tag is associated. Although certain RFID tags have a long read range, the read range of the RFID tag can be limited, for example, by distance or if the RFID tag is embedded in a structure, e.g. surrounded on one or more sides by rubber, concrete, or wood. To operate, the RFID circuit typically receives and consumes RF energy from the interrogator in real time, and may require a minimum energy in order to be able to transmit signals back to the reader. However, even if the energy provided by the interrogation signal is too low for the RFID tag to be able to transmit a signal, the RFID tag can still harvest energy from the interrogation signal. In this case, the RFID tag may passively harvest energy until it has enough energy stored, at which point the RFID chip may activate and begin transmitting its ID in response to the interrogation signal. Thus, due to the energy harvesting, the RFID circuit will act as a "pseudo-battery-assisted" device (i.e., there is no battery, but the harvested and stored charge will temporarily act like a battery to the RFID circuit).

In this way, the energy harvesting RFID tag can be used to identify structures or objects that would normally be out of range of the RFID reader, e.g. in cases in which the RFID reader's interrogation signal is too weak to enable a "normal" (non-energy-harvesting) RFID tag to transmit a response. For example, some RFID circuits require a minimum of 2 volts to operate (i.e., rectified voltage obtained from the RF signal), and will not operate when the voltage obtained from the RF interrogation signal is below this threshold. However, using the energy harvesting RFID tag described herein, energy can still be harvested from the interrogation signal and stored in the charge storage unit 130 until there is enough energy that it can be boosted and applied to the RFID circuit to allow the RFID tag to transmit a response. So, instead of the RFID circuit receiving and consuming RF energy from the interrogator in real time, it could take several seconds (e.g., 5-10 seconds, or longer) before the RFID circuit harvests sufficient energy to activate. For example, if due to distance or the embedded location of the RFID tag, the rectified voltage obtained from the RF signal is 1.5 volts, this would be below a minimum 2 volt threshold to operate the RFID device. However, this 1.5 rectified voltage can still be energy harvested by the circuit described herein and stored in the charge storage unit 130. Once a sufficient amount of energy has been harvested, then the stored 1.5 rectified voltage can be boosted to 2 volts (or other desired amount) and only then fed into the RFID circuit so that it can transmit a signal (including identification information) back to the interrogator. It is contemplated that this alternative system can be accomplished by the circuits and features described herein. Using this method, the RFID circuit would operate like usual and would not be impacted by the long distance or embedded structures that would otherwise prevent operation.

In other modifications of the described embodiments, energy harvesting may be accomplished by means other than RF energy harvesting, for example by means of thermal or vibration energy harvesting. For modified embodiments based on thermal energy harvesting, energy harvesting may be accomplished by means of a thermoelectric generator (TEG) module mounted over a heat gradient. For modified embodiments based on vibration energy harvesting, energy harvesting may be accomplished by means of a vibration energy harvesting module, e.g. containing piezoelectric components that generate a charge in response to vibrations. In these cases, the thermoelectric generator or vibration energy harvesting module can be incorporated into the embodiments disclosed herein, with harvested energy being input to the charge storage unit 130.

The components of the energy harvesting RFID circuit 110A are preferably implemented with analog components. In general, digital components consume relatively more power than analog components when properly implemented and therefore digital components may not be as well suited to the low-power requirements inherent in passive RFID applications. However, portions of the circuit such as the RFID transponder chip 120 may be partially implemented in digital logic at the discretion of the circuit designer. Similarly, other components of the circuit such as the booster switching unit 132 and/or the regulator switching unit 142 may produce binary outputs (ON/OFF). Specifically, the booster switching unit 132 and/or the regulator switching unit 142 may be implemented with transistors to confine their respective output voltages to only two predefined levels, corresponding to the output being either ON or OFF.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. An energy harvesting circuit, comprising:
a radio-frequency identification (RFID) transponder chip configured to:
receive an interrogation request signal, and
produce an activation signal,
at least one capacitor configured to store and output a harvested voltage from a harvested energy;
a boost converter configured to boost the harvested voltage to a boosted voltage; and
a switch configured to receive the activation signal produced by the RFID transponder chip and to activate the boost converter when the activation signal is received by the switch and the harvested voltage is equal to or greater than a first threshold.

2. The energy harvesting circuit of claim 1, wherein the switch is a transistor.

3. The energy harvesting circuit of claim 1, wherein the harvested energy is energy harvested from the interrogation request signal, energy harvested from a thermal energy harvester, or energy harvested from a vibration energy harvester.

4. The energy harvesting RFID circuit of claim 1, wherein:
the harvested energy is harvested from the interrogation request signal,
the harvested voltage is a rectified DC voltage, and
the RFID transponder chip is further configured to produce and output the rectified DC voltage to the at least one capacitor.

5. The energy harvesting circuit of claim 1, further comprising:
a regulator configured to smooth the boosted voltage and produce a regulated output voltage; and
a regulator switch configured to close and thereby supply the boosted voltage to the regulator when the boosted voltage is equal to or greater than a second threshold.

6. The energy harvesting circuit of claim 5, wherein the regulator comprises a shunt regulator and an RC filter.

7. The energy harvesting RFID circuit of claim 5, further comprising:

a boost detector configured to produce a control signal and supply the control signal to the RFID transponder chip when the regulator switch closes.

8. An energy harvesting circuit comprising:
a radio-frequency identification (RFID) transponder chip configured to:
receive an interrogation request signal, and
produce an activation signal,
at least one capacitor configured to store and output a harvested voltage from a harvested energy;
a boost converter configured to boost the harvested voltage to a boosted voltage; and
a switch configured to receive the activation signal produced by the RFID transponder chip and to activate the boost converter when the activation signal is received by the switch and the harvested voltage is equal to or greater than a first threshold,
wherein the at least one capacitor comprises a capacitor bank.

9. An energy harvesting measurement system comprising:
the energy harvesting circuit comprising:
a radio-frequency identification (RFID) transponder chip configured to:
receive an interrogation request signal, and
produce an activation signal,
at least one capacitor configured to store and output a harvested voltage from a harvested energy,
a boost converter configured to boost the harvested voltage to a boosted voltage, and
a switch configured to receive the activation signal produced by the RFID transponder chip and to activate the boost converter when the activation signal is received by the switch and the harvested voltage is equal to or greater than a first threshold;
an external RFID reader;
an antenna connected to an antenna terminal of the energy harvesting circuit and configured to receive the interrogation request signal from the external RFID reader; and
a sensor connected to an input terminal and an output terminal of the energy harvesting circuit and configured to measure a parameter of an object.

10. The energy harvesting measurement system of claim 9, wherein the boosted voltage is supplied as an output voltage to the sensor via the output terminal of the energy harvesting circuit.

11. The energy harvesting measurement system of claim 10, wherein:
the RFID transponder chip is further configured to receive a measurement from the sensor via the input terminal of the energy harvesting circuit, and
the measurement is based on the output voltage and a sensed value of the object.

12. The energy harvesting measurement system of claim 11, wherein the RFID transponder chip is further configured to transmit the measurement to the external RFID reader via the antenna.

13. The energy harvesting measurement system of claim 12, wherein the energy harvesting circuit further comprises a boost detector configured to produce a control signal indicating that the received measurement is valid, and to supply the control signal to the RFID transponder chip.

14. The energy harvesting measurement system of claim 13, wherein the RFID transponder chip is configured to transmit the measurement to the external RFID reader only when the control signal indicating that the received measurement is valid is received from the boost detector.

15. The energy harvesting measurement system of claim 13, wherein:
the energy harvesting circuit further comprises:
a regulator configured to smooth the boosted voltage and produce a regulated output voltage, the regulated output voltage being supplied as the output voltage to the sensor; and
a regulator switch configured to close and thereby supply the boosted voltage to the regulator when the boosted voltage is equal to or greater than a second threshold, and
the boost detector is configured to produce the control signal when the regulator switch is closed.

16. The energy harvesting measurement system of claim 9, wherein the sensor is a strain sensor.

17. The energy harvesting measurement system of claim 9, wherein the object is a pipe fitting.

* * * * *

UNITED STATES PATENT AND TRADEMARK OFFICE
CERTIFICATE OF CORRECTION

PATENT NO. : 10,657,431 B2
APPLICATION NO. : 16/204415
DATED : May 19, 2020
INVENTOR(S) : Joseph Michael Lektomiller Page 1 of 1

It is certified that error appears in the above-identified patent and that said Letters Patent is hereby corrected as shown below:

In the Specification

Column 11, Line 26, "causes Vey to reach" should read -- causes Vcap to reach --

Signed and Sealed this
Fifteenth Day of September, 2020

Andrei Iancu
*Director of the United States Patent and Trademark Office*